United States Patent
Niwa

(10) Patent No.: US 7,286,885 B2
(45) Date of Patent: Oct. 23, 2007

(54) SAFETY PROGRAMMABLE LOGIC CONTROLLER

(75) Inventor: Kuniyuki Niwa, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/484,655

(22) Filed: Jul. 12, 2006

(65) Prior Publication Data

US 2007/0016310 A1 Jan. 18, 2007

(30) Foreign Application Priority Data

Jul. 12, 2005 (JP) ............................ 2005-202402

(51) Int. Cl.
G05B 11/01 (2006.01)
G05B 19/42 (2006.01)
G06F 9/44 (2006.01)

(52) U.S. Cl. ............................ 700/17; 700/18; 700/19; 700/21; 700/86; 717/107; 717/108

(58) Field of Classification Search ............ 700/17–19, 700/21, 86; 717/107–108
See application file for complete search history.

(56) References Cited

U.S. PATENT DOCUMENTS

| | | | | |
|---|---|---|---|---|
| 6,098,116 A * | 8/2000 | Nixon et al. | ................ | 710/8 |
| 6,445,963 B1 * | 9/2002 | Blevins et al. | ................ | 700/44 |
| 6,711,629 B1 * | 3/2004 | Christensen et al. | ........... | 710/8 |
| 2003/0005092 A1 * | 1/2003 | Nelson et al. | ............... | 709/220 |
| 2003/0144753 A1 * | 7/2003 | Otani et al. | ................... | 700/87 |
| 2003/0167347 A1 * | 9/2003 | Combs et al. | ............... | 709/250 |
| 2004/0010326 A1 * | 1/2004 | Schuster | ...................... | 700/79 |
| 2004/0267876 A1 * | 12/2004 | Kakivaya et al. | ........... | 709/200 |
| 2005/0091410 A1 * | 4/2005 | Gibart et al. | ............... | 709/248 |
| 2005/0203645 A1 * | 9/2005 | Klopfer et al. | .............. | 700/79 |
| 2006/0111794 A1 * | 5/2006 | Wysuph et al. | .............. | 700/19 |

FOREIGN PATENT DOCUMENTS

| | | |
|---|---|---|
| JP | 11-3105 | 1/1999 |
| JP | 2002-358106 | 12/2002 |

OTHER PUBLICATIONS

U.S. Appl. No. 11/484,655, filed Jul. 12, 2006, Niwa.
U.S. Appl. No. 11/493,521, filed Jul. 27, 2006, Araki et al.

* cited by examiner

Primary Examiner—Ronald D Hartman, Jr.
(74) Attorney, Agent, or Firm—Oblon, Spivak, McClelland, Maier & Neustadt, P.C.

(57) ABSTRACT

The function block memory unit stores a plurality of function blocks by programming each ladder circuit for computing output signals which has to be determined based on input signals from each safety device according to a connection specification of the safety device. The ladder circuit satisfies a predetermined safety standard, and thus, the function blocks satisfying the safety standard are used. The program link unit sequentially links each function block received from the function block memory unit based on the ID number of each I/O module to automatically create the safety program. The corresponding function block can be uniquely determined based on the ID number.

2 Claims, 8 Drawing Sheets

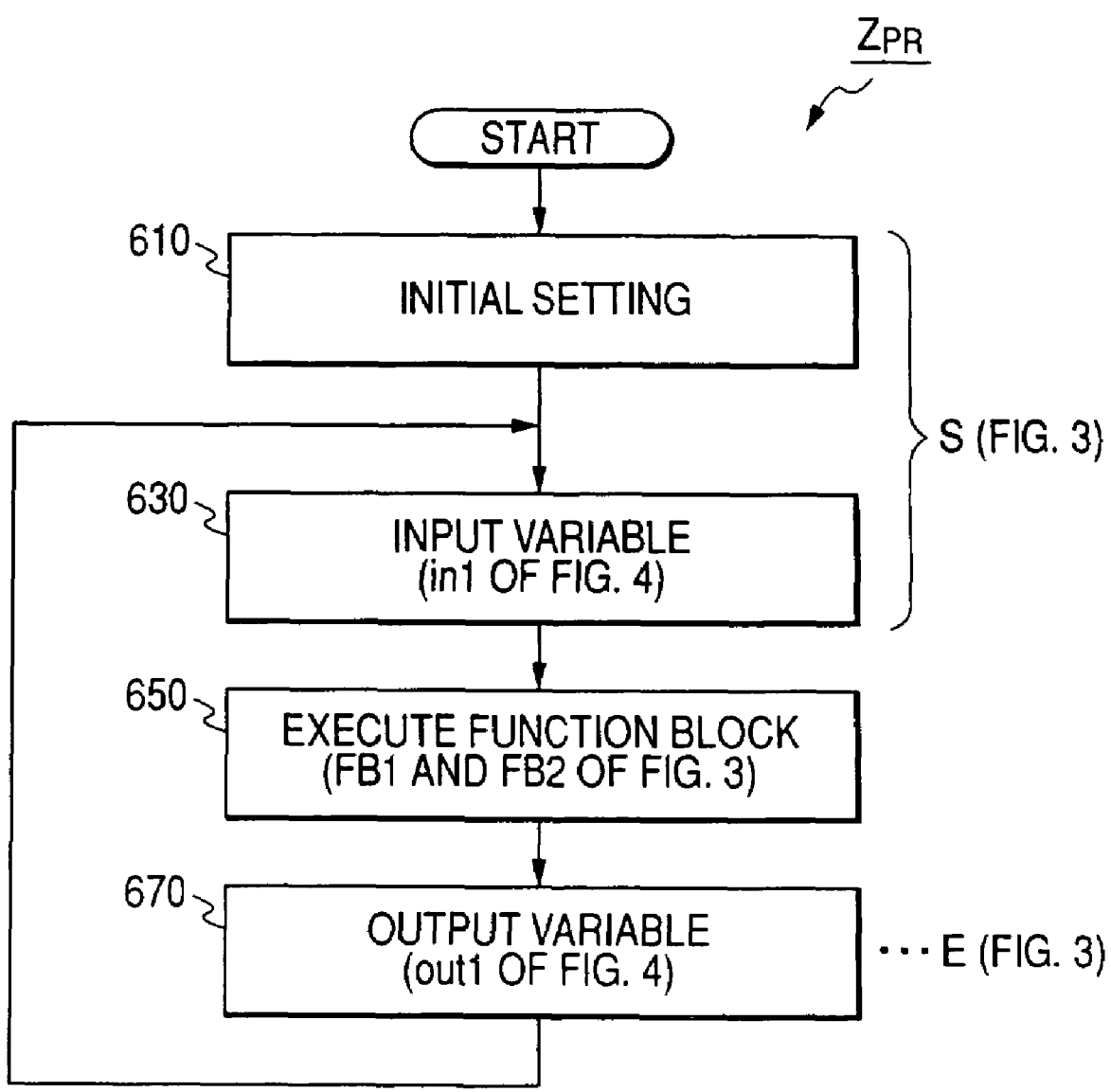

SAFETY PROGRAMMABLE LOGIC CONTROLLER

BACKGROUND OF THE INVENTION

The present invention relates to a safety programmable logic controller (PLC) comprising an I/O module to which a safety device such as an emergency stop switch and a light curtain are connected and a CPU module for executing a safety program for controlling each safety device through the I/O module, and more particularly, to automatically creating the safety program.

Recently, a safety function is commonly introduced into a system controller using a programmable logic controller (hereinafter, referred to as a PLC). The safety function includes, for example, a function for duplexing a CPU, an MPU, or various processing units to allow a processing result to be appropriately output, and a function of halting a system operation based on a predetermined fail safe operation when an emergency condition occurs in a system, and the like. For example, the emergency condition may occur when an emergency stop switch is pressed or when a sensor such as a light curtain detects invasion of a person.

A safety PLC for constructing such a system as disclosed in the patent document 1 is well known in the art.

For example, a standard for creating a safety program has been published from an international electrotechnical commission (IEC). In order to producing a safety program which satisfies this standard, a high level of technical knowledge for the safety program is required.

Meanwhile, in order to reduce the problems relating to productivity or development cost for a sequence program of a general PLC, a programming device has been proposed as disclosed in the patent document 2.

Patent Document 1: Japanese Unexamined Patent Application Publication No. 2002-358106
Patent Document 2: Japanese Unexamined Patent Application Publication H11-3105

However, the related programming device disclosed in the patent document 2 processes a user program (e.g., a sequence program) described by using advanced programming languages such as a C or a ladder. Therefore, users should prepare a user's program by using such a program language.

Additionally, in order to produce a user's program (i.e., the safety program), a user should have a high level of knowledge for a predetermined safety standard, ripe experience for production of the safety program, and the like. Therefore, it requires a long time and a high manufacturing cost.

SUMMARY OF THE INVENTION

The present invention is contrived to solve the aforementioned problems, and provides a safety PLC which does not require for a user to be specifically conscious of a construction of safety program In order to solve the above problem, the present invention is characterized by the following arrangement.

(1) A safety programmable logic controller (PLC) comprising:

I/O modules which are connected to safety devices for detecting a predetermined condition at any time and constructed to satisfy an individual connection specification of each of the safety devices, respectively;

a CPU module that executes a safety program for managing the I/O modules; and a connector for interconnecting the I/O modules and the CPU module with each other, wherein the CPU module comprises:

a function block memory unit that stores a plurality of function blocks which are separately prepared for the respective connection specifications of the safety devices, a ladder circuit for computing an output signal to be determined based on an input signal from the corresponding safety device being programmed in each of the plurality of function blocks, an ID number obtaining unit that reads identification numbers of the I/O modules connected to the connector, and a program link unit that sequentially links the function blocks received from the function block memory unit based on the read identification numbers to create the safety program.

(2) The safety PLC according to (1), wherein one piece of output information output from one of the function blocks on a predetermined factor area that can be referenced or updated by the safety program is used as input information to at least one of another remaining function blocks to connect the plurality of function blocks in a cascade manner.

In this case, the identification (ID) number is to determine a classification of each I/O module and is defined for each I/O module.

According to the present invention, the aforementioned problems can be effectively or reasonably solved.

The following effect can be obtained by the present invention.

According to the present invention, since each individual function block is uniquely determined by the ID number in relation with a specific classification of the I/O module, which is provided for each safety device and implemented by using each safety device, a desired safety program can be automatically created by sequentially linking each function block.

Therefore, it is possible to provide a safety PLC by which a user is not required to be conscious of a construction of the safety program in detail.

Further, according to the present invention, since one piece of the output information output from any function block to the factor area is directly input to another function block, it is possible to easily connect the function blocks with one another in a cascade manner.

BRIEF DESCRIPTIONS OF THE DRAWINGS

FIG. 8 is a flowchart illustrating operations in the safety program Z.

DETAILED DESCRIPTION OF PREFERRED EMBODIMENTS

Hereinafter, an embodiment of the present invention will be described in detail with reference to the accompanying drawings.

The present invention is not limited by the embodiment which will be described below, but may be embodied in various forms.

Figure 1:
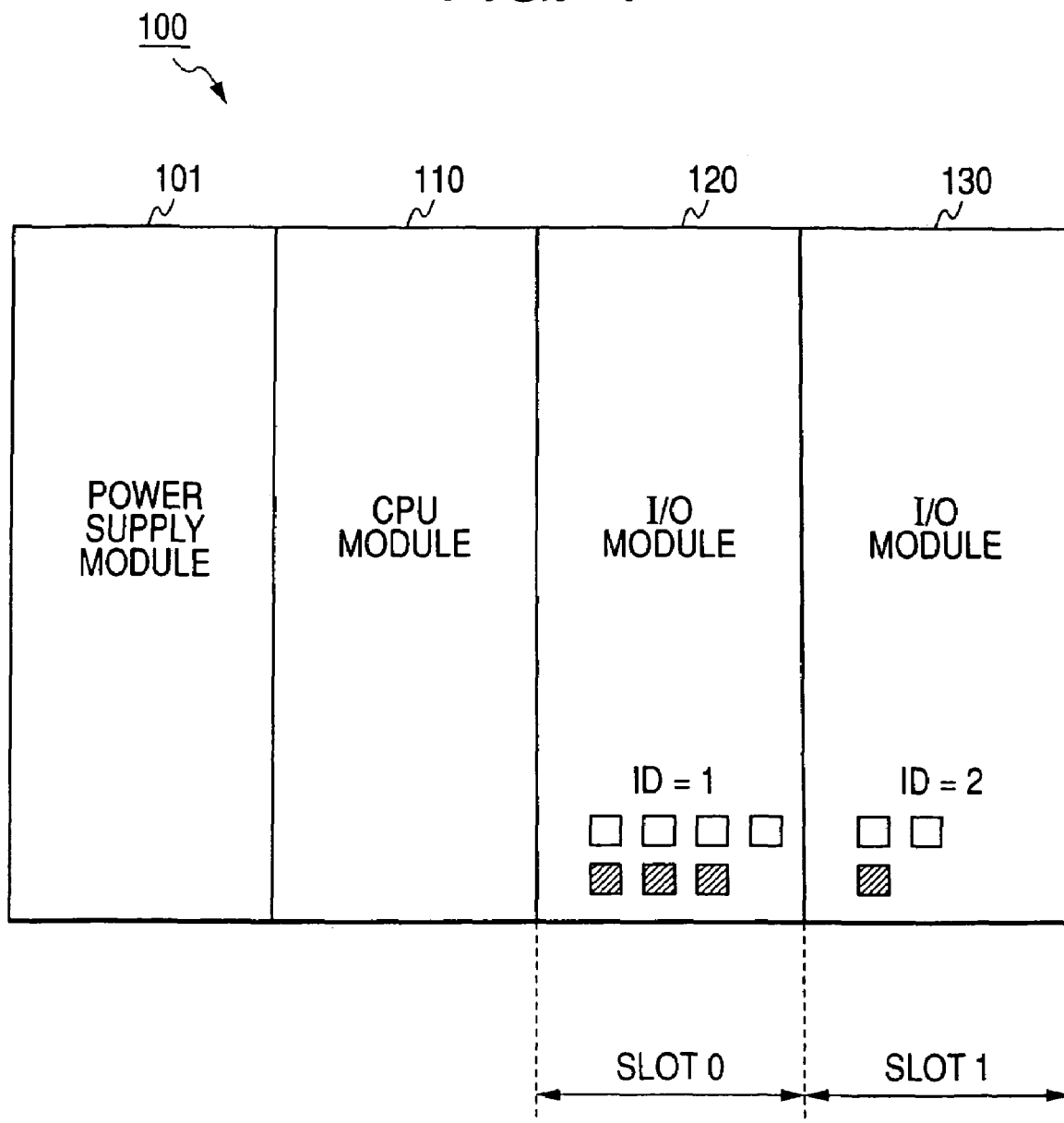
FIG. 1 is a schematic diagram illustrating a logic construction of a safety PLC 100 according to the first embodiment of the present invention.

FIG. 1 is a schematic diagram illustrating a logic construction of a safety PLC 100 according to the embodiment of the present invention. The safety PLC 100 includes a power supply module 101, a CPU module 110 for executing a safety program for managing an I/O module, a standard device I/O module 120, and an optional device I/O module 130. Hereinafter, the standard device I/O module 120 is referred to as a master module 120. The master module 120 has a safety function such as an emergency stop function and a servo power supply on/off control function according to a standard.

A safety device for detecting a predetermined condition relating to safety at any time is connected to each I/O module. Additionally, each I/O module is constructed to satisfy an individual specification adapted to each connection specification of each connectable safety device. These safety devices may be various detection devices such as a duplexed emergency stop button, a light curtain, a door lock sensor, a mat switch, and a laser scanner.

An input/output operation of the safety device (e.g., a detection device) is performed by using external input and output contacts as an input/output interface. For example, four external input contacts and three external output contacts may be provided in the master module 120.

Each module includes a micro-processing unit (MPU), a random access memory (RAM), a read-only memory (ROM), an input/output interface, and the like. Each of the modules are connected to each other through an input/output bus 102 as shown in FIG. 2 as a connector.

Figure 2:
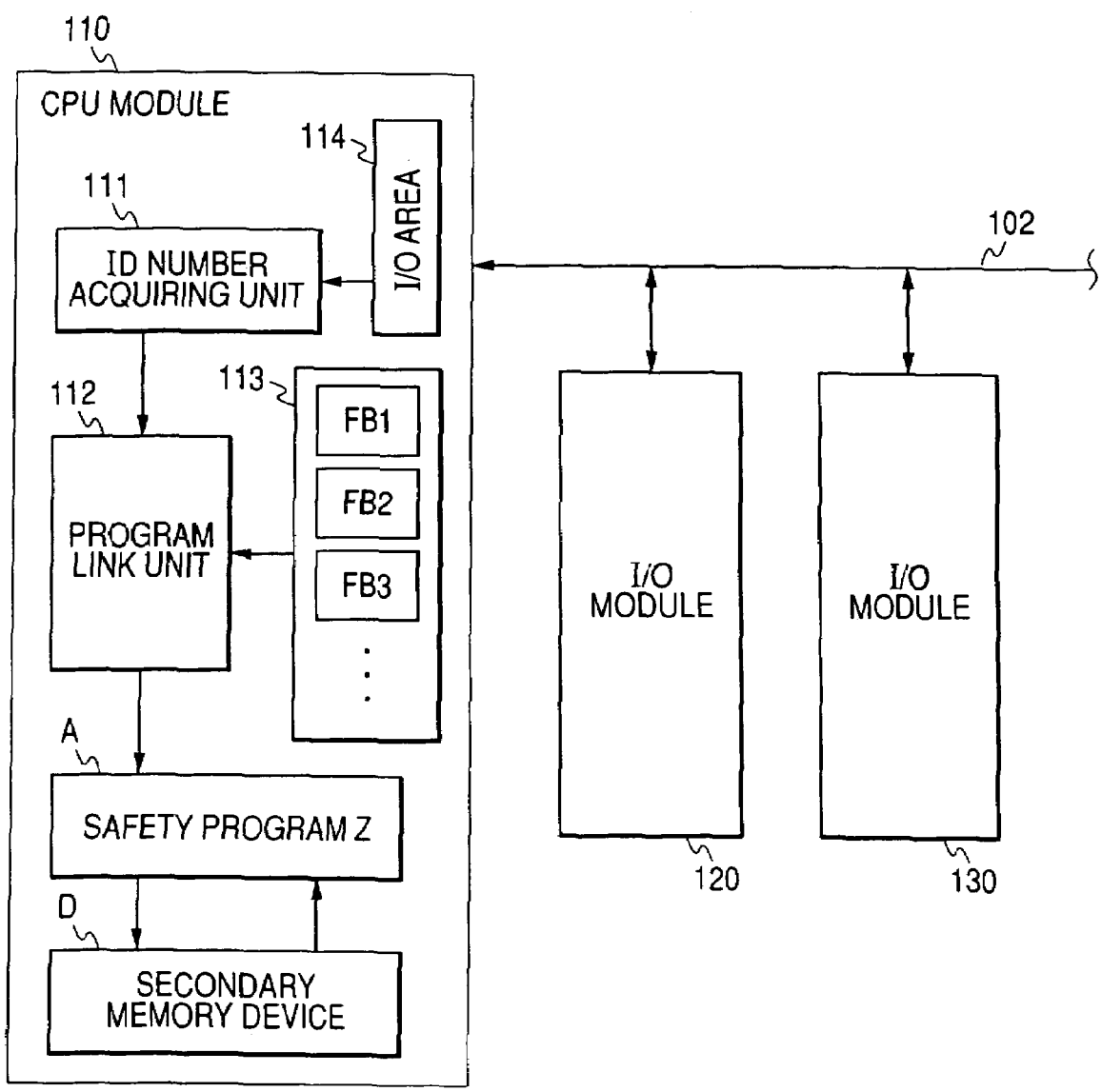
FIG. 2 is a block diagram illustrating a logic construction of a CPU module 110.

FIG. 2 is a block diagram illustrating a logical construction of a CPU module 110. The CPU module 110 includes an ID acquiring unit 111, a program link unit 112, a function block memory unit 113, an I/O region 114, and the like. For example, the I/O area 114 denotes an input/output data buffer area formed in a predetermined segment in a main memory device, and the input/output data in the I/O area 114 is referenced or updated from other modules (such as I/O modules 120 and 130) based on the operation of the input/output bus 102 when it operates.

The function block memory unit 113 stores a plurality of function blocks FB1, FB2, FB3, . . . , in which a ladder circuit for computing output signals to be determined depending on input signals from each safety device is programmed for each connection specification of each safety device. The ladder circuit is adapted to a predetermined safety standard. Therefore, these function blocks FB1, FB2, FB3, . . . , also are adapted to a corresponding safety standard.

The ID acquiring unit 111 reads ID numbers of each I/O module 120 and 130 connected to the input/output bus 102 through the I/O area 114. The program link unit 112 sequentially links the function blocks received from the function block memory unit 113 based on the read ID numbers so as to automatically create a safety program Z on a predetermined area A in the main memory device.

Since the corresponding function block can be uniquely determined based on the ID number, the safety function associated with each safety device can be individually implemented in the unit of a function block that has been prepared.

A secondary memory device D may be any non-volatile memory device such as a writable ROM that can be mounted on the CPU module 110.

Figure 3:
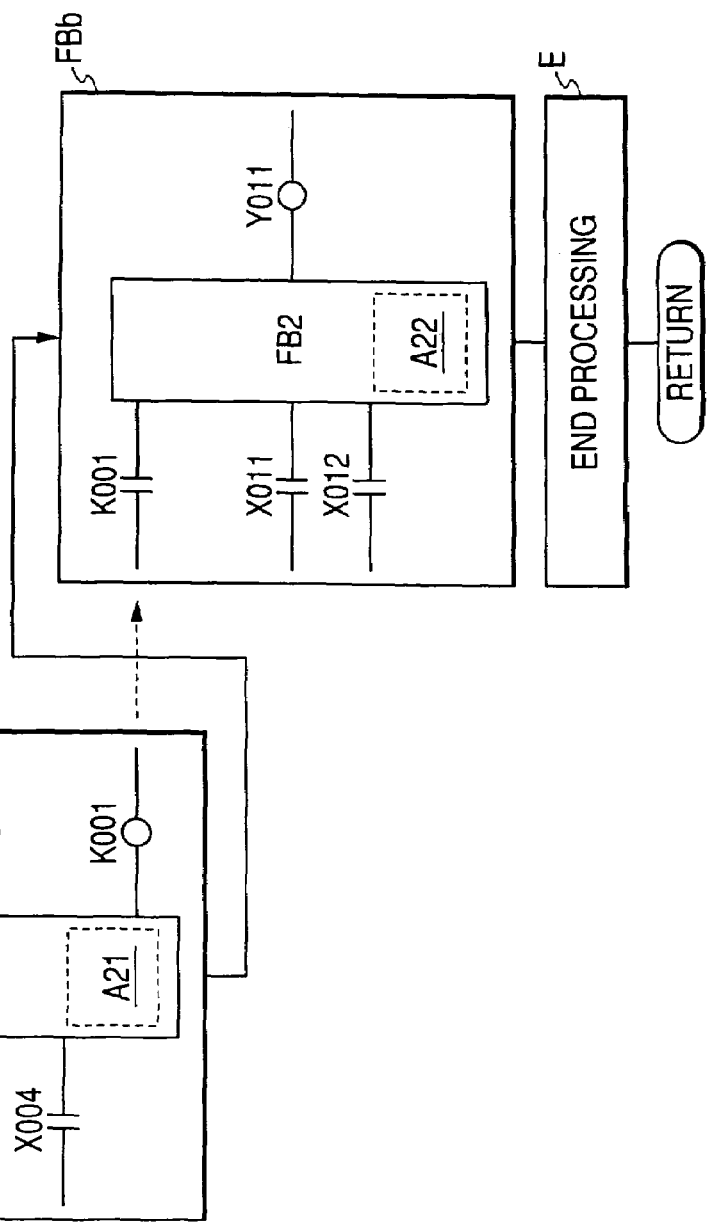
FIG. 3 is a program structure view illustrating a connection construction of a safety program Z.

FIG. 3 is a schematic diagram illustrating an interconnection structure of a safety program Z. The function block FBa is a sequence program for implementing the safety operation that has to be represented by the master module 120. All of variables X001 to X004 directly corresponding to the four external input contacts and variables Y001 to Y003 directly corresponding to the three external output contacts are maintained on the I/O area 114. Hereinafter, these variables X001 to X004 and Y001 to Y003 are referred to as external variables of the function block FB1.

The function block FB1 connected by the program link unit 112 has an internal variable storage area A21. An initial processing S includes an input processing for copying the variables X001 to X004 directly corresponding to the external input contacts to the internal variable storage area 21. Additionally, an end processing E includes an output processing for copying the computed output information on the internal variable storage area A21 to the variable Y001 to Y003.

The function block FBb having the function block FB2 connected to the function block FB1 is constructed in a similar manner. However, the function block FBb is a sequence program for implementing the safety operation that has to be represented by the I/O module 130.

A factor K001 relating to the cascade connection is commonly used between the function blocks FBa and FBb. As a result, one piece of the output information from any function block (e.g., FBa) can be used as input information to another function block (e.g., FBb). Therefore, it is possible to construct a cascade connection between these function blocks (e.g., FBa and FBb).

For example, this cascade connection may be constructed in a unidirectional manner from top to down along a plurality of I/O modules (i.e., function blocks) as shown in FIG. 3. Otherwise, the cascade connection may be constructed in a cyclic manner in a predetermined direction through all I/O modules (i.e., function blocks).

For example, when the factor K001 shown in FIG. 3 is used as an emergency stop signal for turning off the power of the servo motor and the like, it is possible to sequentially transfer the emergency stop signal from the function block FBa toward the function block FBb located in a downstream side. Such a construction for transferring the emergency stop signal allows a desired safety system to be stopped quickly and safely in an emergency condition.

Hereinafter, a relationship between the safety program Z and the I/O area 114 will be described with reference to FIG. 4. An I/O region 1140 for the slot 0 of FIG. 1 is defined on top of the I/O area 114 which is used as a buffer region for storing the input/output data. This I/O region 1140 is a main memory region relating to input and output operations of the I/O module 120 (i.e., the master module) of FIG. 1, and stores the data communicated with the master module and referenced or updated through the input/output bus 102. Each of the remaining I/O regions 1141, 1142, . . . similarly corresponds to each slot.

Figure 4:
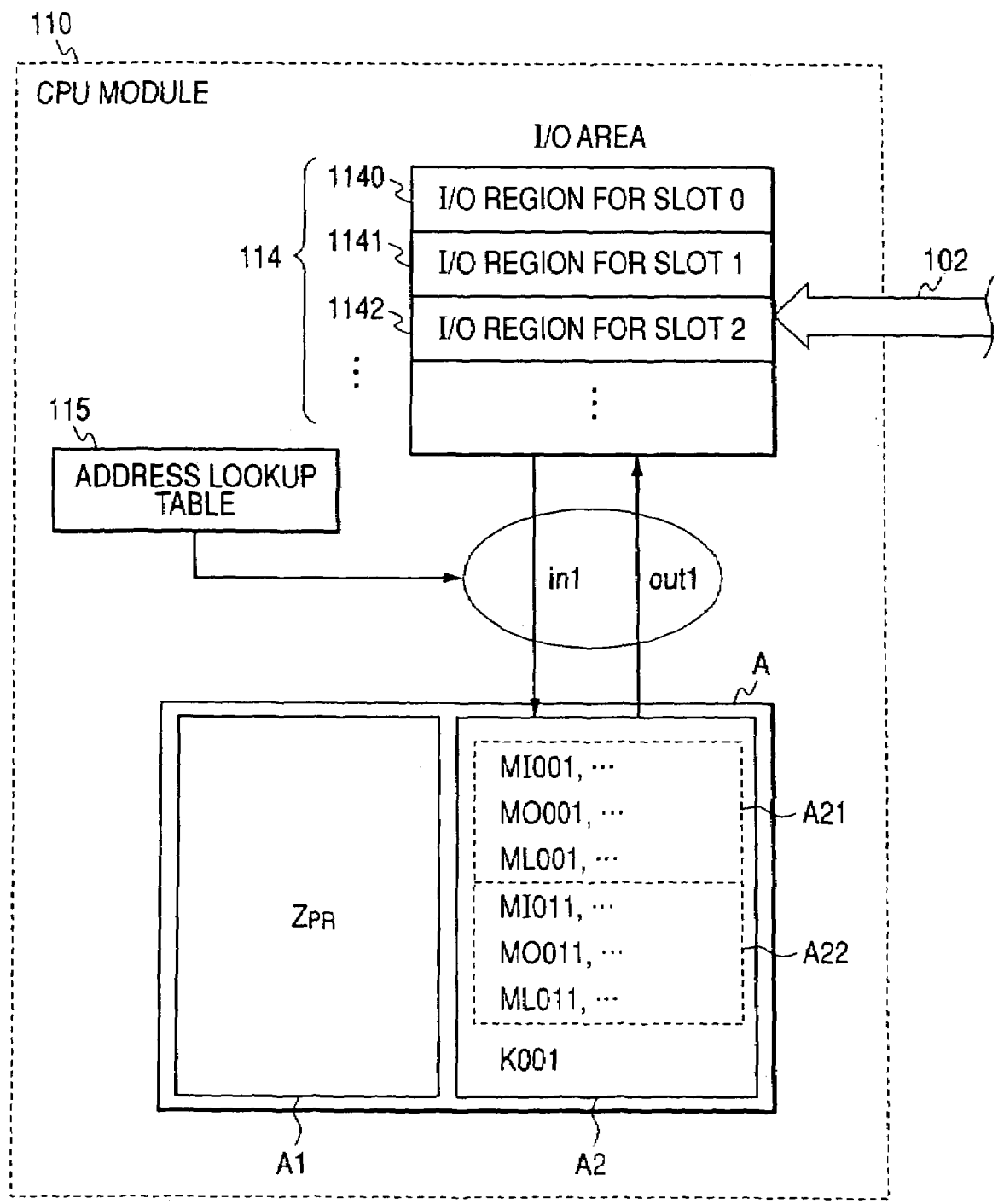
FIG. 4 is a schematic diagram for describing a relationship between an I/O area 114 and a safety program Z.

The safety program Z of FIG. 3 is located in the area A of FIG. 4 defined on the main memory device. The area A includes a program area A1 for storing a procedure unit $Z_{PR}$ constructed of executable machine instructions included in a safety program Z and an internal variable area A2 including the internal variable storage regions A21 and A22 for storing internal variables referenced or updated by the procedure unit $Z_{PR}$. As described below with reference to FIGS. 5 and 6, an address lookup table 115 uniquely defines each relationship between the external input/output variable such as X001 and Y001 stored in the I/O area 114 and the internal variable (e.g., the input/output factor) stored in the internal variable area A2.

Figure 5:
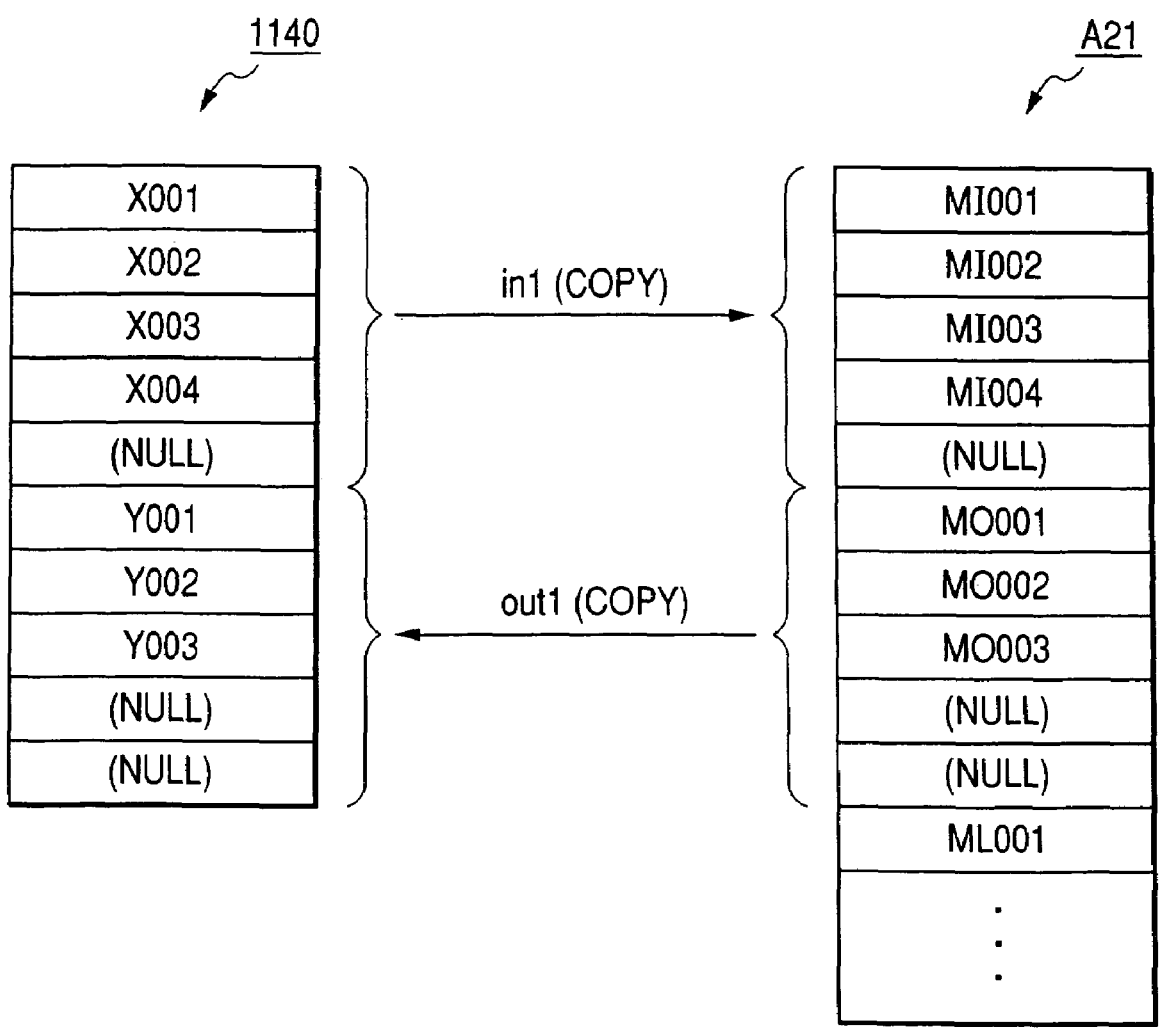
FIG. 5 is a schematic diagram for describing an operation of referencing or updating external variables in the I/O area 114.

FIG. 5 illustrates a reference/update operation for external variables X001, X002, ..., and Y001, Y002, ... stored in the I/O area 114. The table 1140 of FIG. 5 shows a construction of the I/O region 1140 for the slot 0 of FIG. 4.

The internal variables referenced or updated only by the function block FB1 of FIG. 3 are stored in the internal variable storage area A21 of FIGS. 4 and 5. These internal variables can be classified into input factor internal variables MI001 to MI004 corresponding to the external input variables X001 to X004; output factor internal variables MO001 to MO003 corresponding to the external output variables Y001 to Y003; and remaining local internal variables ML001, ML002, ..., that do not directly relate to these input/output variables.

Therefore, the input operation in1 shown in FIGS. 4 and 5 corresponds to the aforementioned input processing executed by the initial processing S, and the output operation out1 shown in FIGS. 4 and 5 corresponds to the aforementioned output processing executed by the end processing E.

Needless to say, the input and output operations in1 and out1 are similarly executed for the slot 1 (i.e., the I/O module 130).

Figure 6:
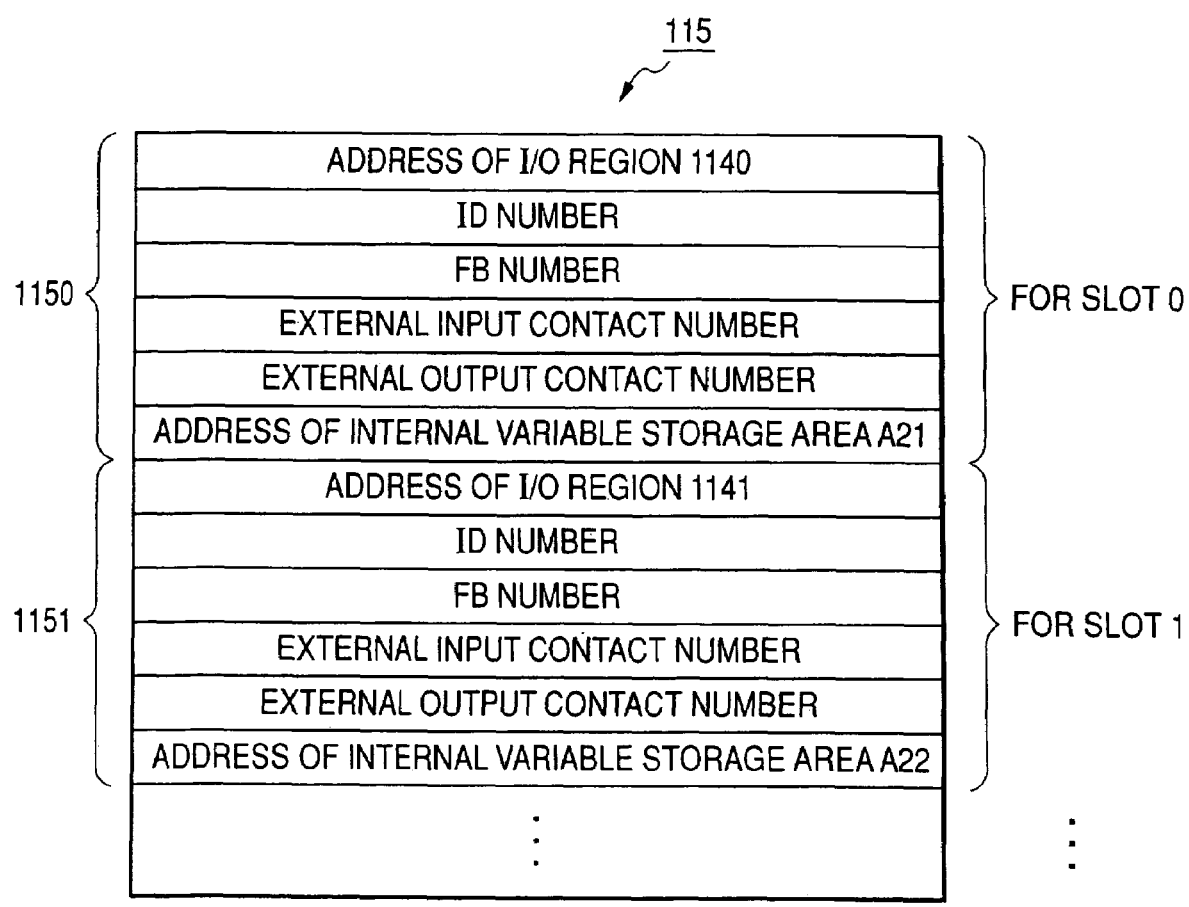
FIG. 6 is a table structure view illustrating an address lookup table 115.

FIG. 6 illustrates a construction of the address lookup table 115. The area 1150 of the address lookup table 115 corresponds to the slot 0, and stores an address of the I/O region 1140, an ID number of the I/O module 120 located in the slot 0, a function block number (an FB number) corresponding to this ID number, the number of connections of the external input and output contacts included in the I/O module 120, and an address of the internal variable storage region A21. Hereinafter, the remaining regions 1151, 1152, ... are similarly defined for each slot.

In this case, it is important that each function block FB1, FB2, FB3, ... of FIG. 2 is prepared for each classification of the I/O module uniquely defined by the ID number, and the internal variable storage areas A21 and A22 of FIGS. 3 and 4 are prepared for each slot. According to this construction, it is possible to automatically and dynamically create the safety program Z.

Figure 7:
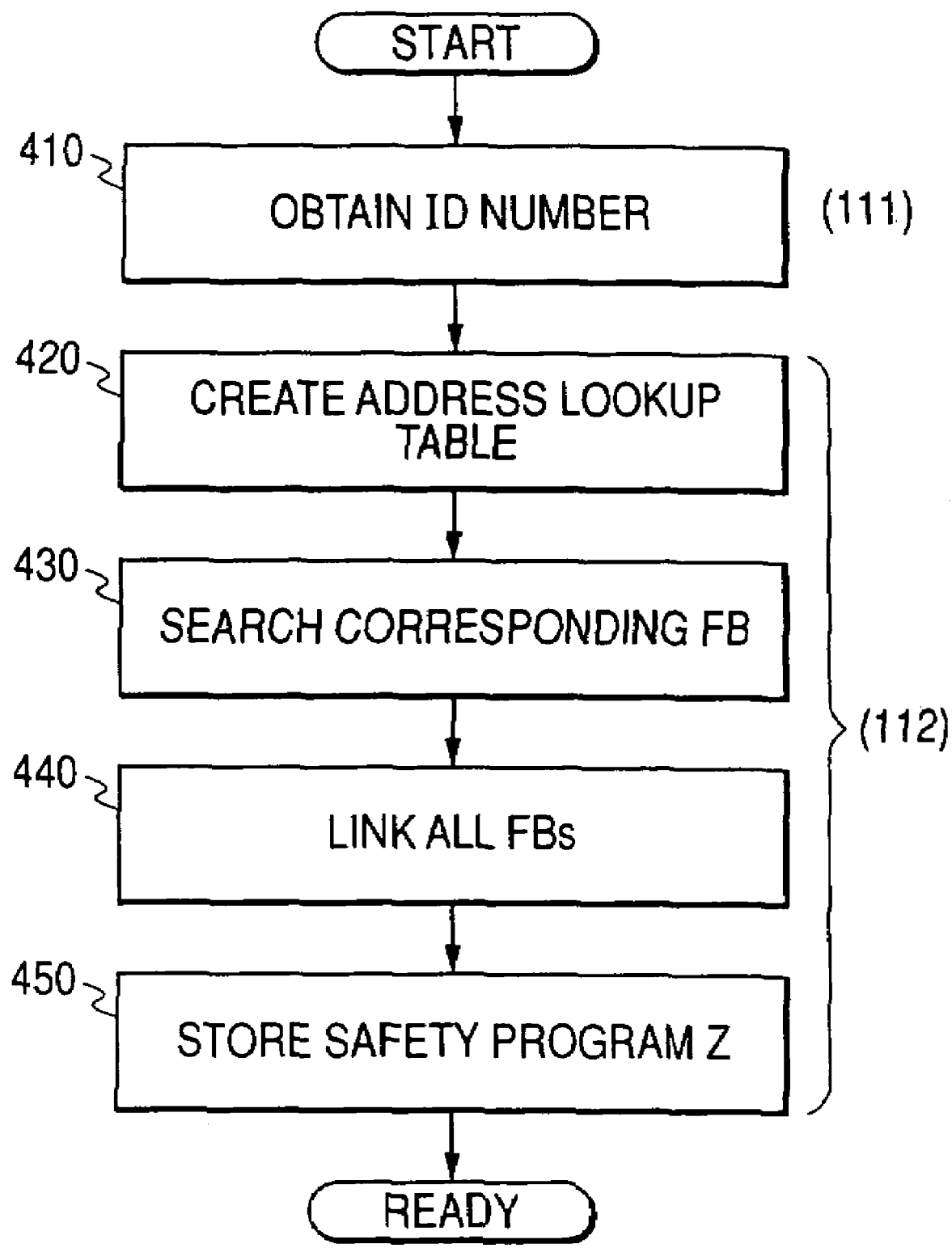
FIG. 7 is a flowchart illustrating a control order for implementing a program link unit 112.

FIG. 7 is a flowchart illustrating a control procedure for implementing the program link unit 112. In the first step 410 of this processing, the ID number of each I/O module connected to the input/output bus 102 is sequentially read according to the slot number from the slot 0 by using the ID number acquiring unit 111, and stored in a corresponding region in the address lookup table 115 of FIG. 6.

Subsequently, the following steps 420 to 450 are executed to implement the program link unit 112 of FIG. 1.

In the step 420, the address lookup table 115 is completed based on the specific classification of each I/O module defined by the ID number.

Then, in the step 430, the data stored in the function block memory unit 113 are sequentially retrieved from the top region 1150 based on the address lookup table 115 completed in the step 420 in order to search for the corresponding function blocks FB1, FB2, FB3, . . . . Then, the corresponding function blocks are loaded on corresponding regions on the area A.

In the step 440, a relationship between each internal variable defined in the internal variable area A2 for the input/output processing which uses the input/output bus 102 and each external variable defined in the I/O area 114 for each input/output operation are determined based on the address lookup table 115 as shown in FIG. 5. The function block FB1, FB2, FB3, ... loaded on the main memory device is linked to an executable program.

In the step 450, the safety program Z that has been automatically created in the step 440 is stored in a secondary memory device D of FIG. 2.

Then, a fact that the safety program Z created in the main memory device is in an executable condition (the ready condition in FIG. 7) is notified to a user by using an LED display and the like in order to allow the user to execute manipulation of a RUN switch.

Additionally, the user who activates the safety program Z installs each safety device in the corresponding I/O module. The connection conditions of the safety devices are inspected by using the safety program Z. Subsequently, after it is verified that these connections satisfy corresponding connection specifications, a condition of a desired system is changed to a safely operable condition (i.e., a safe condition) based on a setting or an operation of the safety program Z.

As a result, an operator who organizes the system is not necessary to have a high level of knowledge about the content of the safety program in detail, but is just required to identify the connection condition of the safety device, or have appropriate understanding about a safety device which has to be guaranteed.

Therefore, according to the present invention, since a safety program satisfying a predetermined safety standard can be automatically created, it is possible to remarkably reduce various working times such as an adjustment time or a design time for implementing the safety system.

Finally, operations of the safety program Z automatically created on the area A will be described with reference to FIG. 8. The procedure unit $Z_{PR}$ of this safety program Z is created on the program area A1 in the area A. In addition, the factor used by the procedure unit $Z_{PR}$ is located in the internal variable area A2.

First, in the initial setup processing of the step 610 of FIG. 8, the initial program is executed in one time when power is supplied or a reset or restart operation is initiated.

Then, the procedure unit $Z_{PR}$ reads the variable (e.g., an input variable) representing the condition of each I/O module from the I/O region for each slot in the I/O area 114 and input it to the corresponding internal variable area A2 in a predetermined first control period (the step 630 in FIG. 8). Each function block FB1 and FB2 is sequentially executed by referencing these factors at any time (the step 650 in FIG. 8).

Each factor stored in the internal variable area A2 is referenced or updated by the execution in procedure unit $Z_{PR}$. Then, as a final processing of the first control period, the procedure unit $Z_{PR}$ outputs output information representing content of instructions for each I/O module from the internal variable area A2 to the I/O area 114 (the step 670 of FIG. 8). This output operation is exclusively executed for the access operation of the input/output bus 102 for the I/O area 114.

Before and after the aforementioned operations of the procedure unit $Z_{PR}$, the data in the I/O area 114 are transmitted and received through the input/output bus 102 according to the input/output control program in the system.

What is claimed is:

1. A safety programmable logic controller (PLC), comprising:

I/O modules, which are connected to safety devices, configured to detect a predetermined condition at any time and constructed to satisfy an individual connection specification of each of the safety devices, respectively;

a CPU module configured to execute a safety program for managing the I/O modules; and a connector configured to interconnect the I/O modules and the CPU module with each other, wherein the CPU module includes a function block memory unit configured to store a plurality of function blocks which are separately prepared for the respective connection specifications of the safety devices, a ladder circuit configured to compute an output signal to be determined based on an input signal from the corresponding safety device being programmed in each of the plurality of function blocks, an ID number obtaining unit configured to read identification numbers of the I/O modules connected to the connector, and a program link unit configured to sequentially link the function blocks received from the function block memory unit based on the read identification numbers to create the safety program.

2. The safety PLC according to claim 1, wherein one piece of output information output from one of the function blocks on a predetermined factor area that is referenced or updated by the safety program is used as input information to at least one of another remaining function blocks to connect the plurality of function blocks in a cascade manner.

* * * * *